Figure 1:
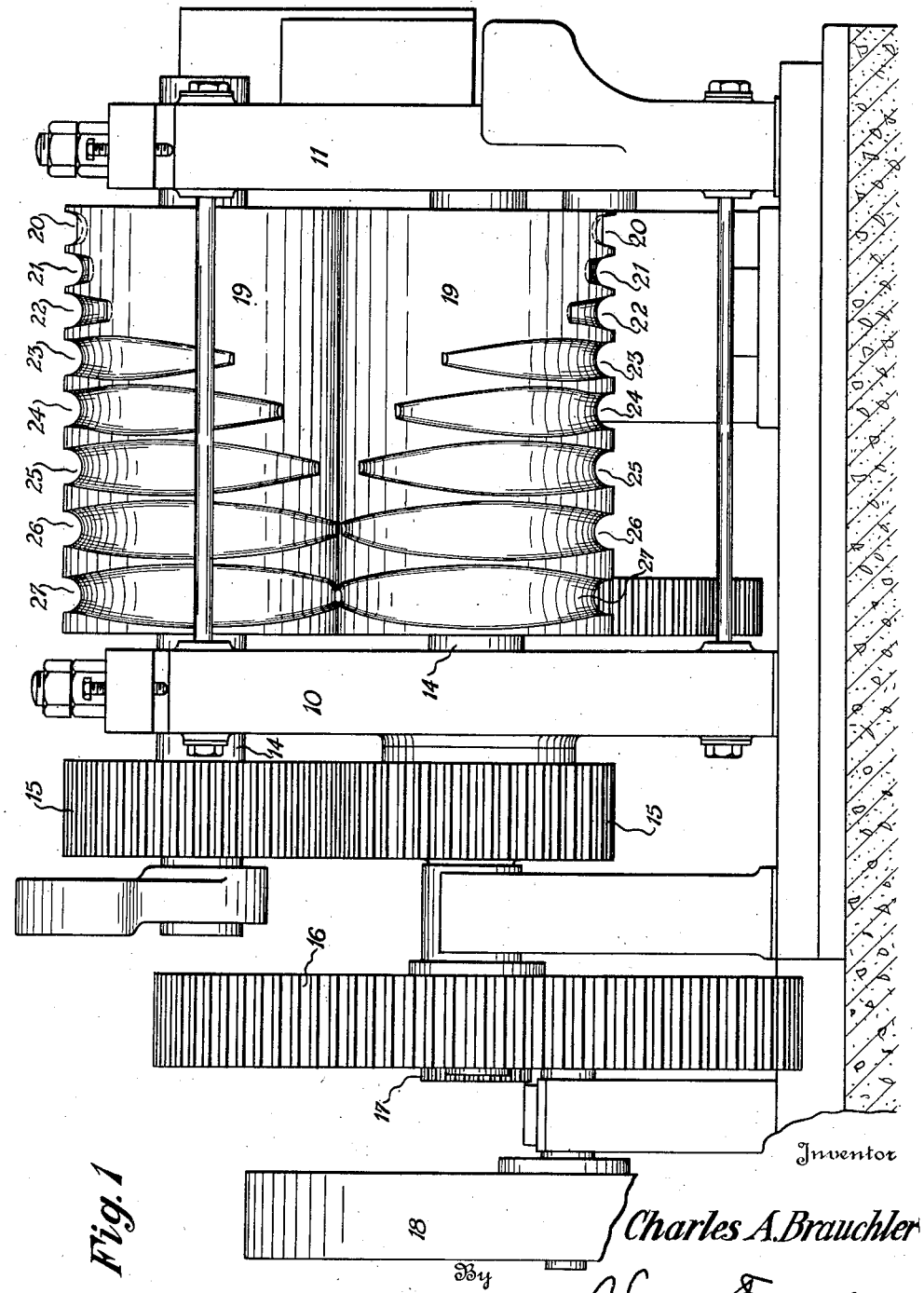

Oct. 18, 1932.    C. A. BRAUCHLER    1,883,519
FORGING PROPELLER BLADES
Filed Aug. 22, 1929    4 Sheets-Sheet 2

Inventor
Charles A. Brauchler
By Harry Frease
Attorney

Oct. 18, 1932.   C. A. BRAUCHLER   1,883,519
FORGING PROPELLER BLADES
Filed Aug. 22, 1929    4 Sheets-Sheet 3

Inventor

Charles A. Brauchler

By Harry Frease

Attorney

Oct. 18, 1932.  C. A. BRAUCHLER  1,883,519
FORGING PROPELLER BLADES
Filed Aug. 22, 1929   4 Sheets-Sheet 4
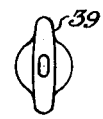
*Fig. 17*  *Fig. 18*
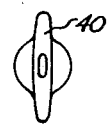
*Fig. 19*  *Fig. 20*
*Fig. 21*
*Fig. 22*
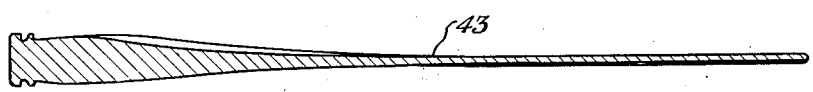
*Fig. 23*
Inventor
Charles A. Brauchler
By Harry Frease
Attorney Patented Oct. 18, 1932

1,883,519

UNITED STATES PATENT OFFICE

CHARLES A. BRAUCHLER, OF CANTON, OHIO

FORGING PROPELLER BLADES

Application filed August 22, 1929. Serial No. 387,607.

The invention relates to blades for the propellers of airplanes and more particularly to a new and novel method of forging such blades.

It is common practice in the manufacture of airplane propellers to forge the propeller blades, starting with a bar blank which is elongated by hammering, this elongation being commonly produced by taking bites at different points upon the bar blank with the hammer.

This method of elongation considerably distorts the grain flow and produces whirls extending more or less transversely of the blade. As it is impossible to accurately size the blank with this hammer elongation, a considerable amount of flash or fin is produced in the final hammering operation, increasing the distortion of the grain flow, whereby the spongy central portion of the bar blank frequently extends out through the sides of the finished forging at many points.

When the flash or fin is trimmed off, the distorted or whirling cords of the grain will be severed in many places, materially weakening the finished forging.

Blades of either ferrous or non-ferrous metals may be forged by the improved method, but the present improvement especially contemplates the forging of such blades from magnesium. In the past, it has not been practical to produce forgings of magnesium by the hammer or press forging methods, but it has been found that very satisfactory forgings may be roll forged from magnesium by the improved method.

The object of the present improvement is to provide a method of forging propeller blades by which the distortion of the grain flow is reduced to a minimum, producing a substantially straight longitudinal grain flow and uniform molecular structure throughout the blade and compressing the spongy core within the central portion thereof.

A further object of the invention is to provide for the forging of such articles from magnesium by the improved roll forging method in which only a very small portion of the metal is forged at a time, as distinguished from the hammer or press forging in which the entire article is acted upon by the dies with each operation.

The above and other objects may be attained by roll forging a bar blank to elongate the same to nearly the required dimensions and then hammer forging to the finished shape.

Figure 2:
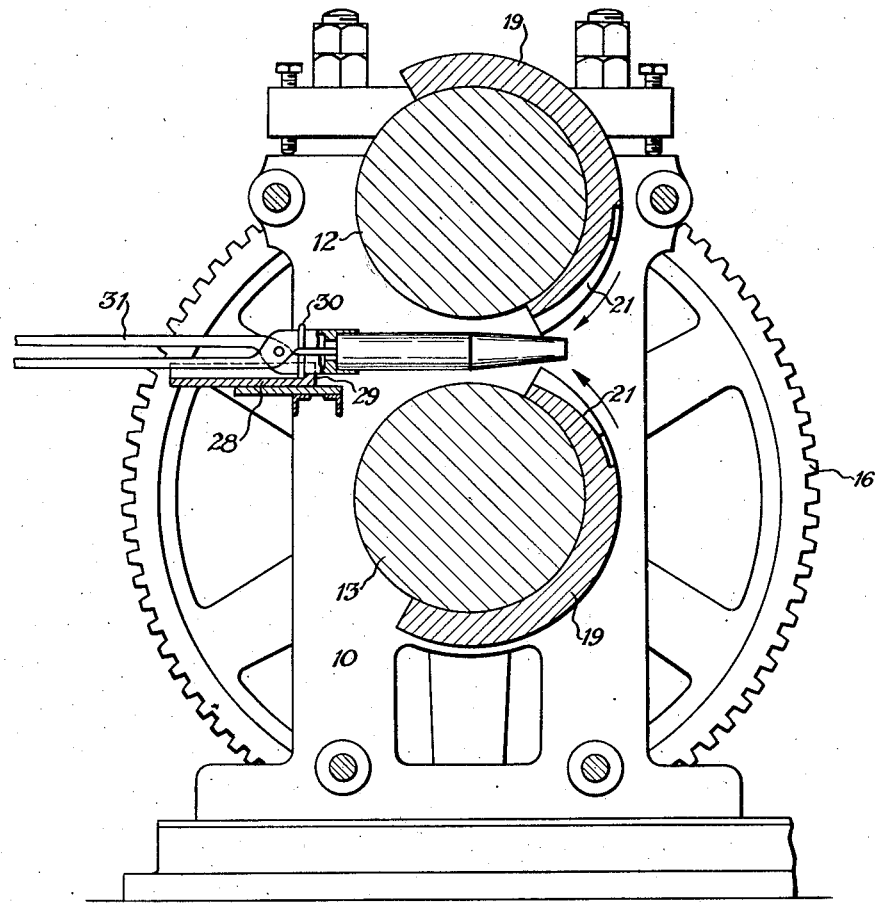
Figures 24, 25:
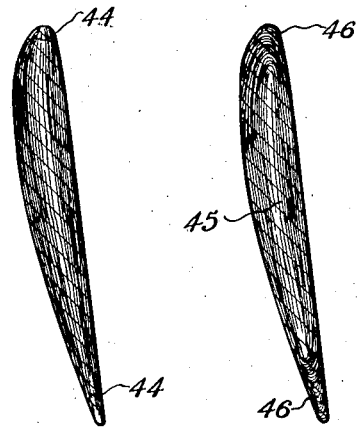
Figure 3:
Figure 4:
Figure 5:
Figure 6:
Figure 7:
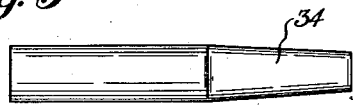
Figure 8:
Figure 9:
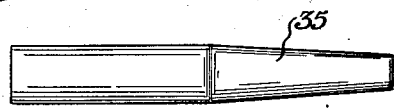
Figure 10:
Figure 11:
Figure 12:
Figure 13:
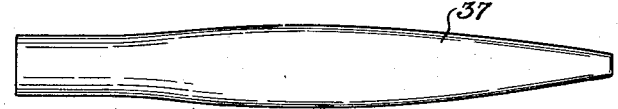
Figure 14:
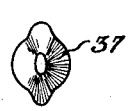
Figure 15:
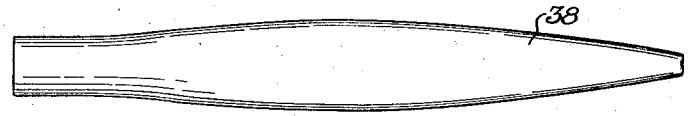
Figure 16:
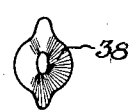

An embodiment of the invention is illustrated in the accompanying drawings, in which Figure 1 is a front elevation of a forging mill designed to elongate the bar blank by roll forging;

Fig. 2, a transverse sectional view of the mill;

Fig. 3, a side elevation of the blank bar from which the forging is made;

Fig. 4, an end elevation of the same;

Fig. 5, a side elevation of the bar after the first rolling operation;

Fig. 6, an end elevation thereof;

Fig. 7, a side elevation of the bar after the second rolling operation;

Fig. 8, an end elevation thereof;

Fig. 9, a side elevation of the bar after the third rolling operation;

Fig. 10, an end elevation thereof;

Fig. 11, a side elevation of the bar after the fourth rolling operation;

Fig. 12, an end elevation thereof;

Fig. 13, a side elevation of the bar after the fifth rolling operation;

Fig. 14, an end elevation thereof;

Fig. 15, a side elevation of the bar after the sixth operation;

Fig. 16, an end elevation thereof;

Fig. 17, a side elevation of the bar after the seventh rolling operation;

Fig. 18, an end elevation thereof;

Fig. 19, a side elevation of the bar after the last rolling operation;

Fig. 20, an end elevation thereof;

Fig. 21, a side elevation of the bar after the hammer forging operation;

Fig. 22, a similar view after the flash or fin has been trimmed therefrom;

Fig. 23, a section on the line 23—23, Fig. 22;

Fig. 24, a transverse section on an enlarged scale through the finished blade; and Fig. 25, a similar view through a blade formed under the old method.

Similar numerals refer to similar parts throughout the drawings.

In Figs. 1 and 2 is illustrated the forging mill in which the elongation of the bar blank is produced by roll forging.

This mill includes the housings 10 and 11 in which are journaled the upper and lower rolls 12 and 13 respectively, the necks 14 of which may have gears 15 fixed thereon and meshing with each other for causing the rolls to rotate in unison.

For the purpose of driving the rolls, a large gear 16 may be fixed upon the neck of one roll to be driven from any suitable source of power, as by the pinion 17, a fly wheel 18 being provided if desired.

As best shown in Fig. 2, the rolls 12 and 13 are separated and each has fixed thereon an arcuate forging die 19 extending substantially halfway around the surface of the roll.

Each of the dies 19 has formed in its peripheral surface a similar series of circumferential die impressions, as indicated at 20, 21, 22, 23, 24, 25, 26 and 27, through which the bar blank is successively passed to gradually elongate and shape the same through the steps indicated in Figs. 3 to 20 inclusive of the accompanying drawings.

The mill may be provided with a rest plate 28 supported between the housings and located in front of the bite of the roll dies and having a stop flange 29 for engagement with the lug 30 upon the tongs 31 within which the bar blank is gripped. The rolls 12 and 13 are continuously rotating in the directions of the arrows shown in Fig. 2.

In carrying out the roll forging operations to elongate the bar, a heated bar blank 32, which may be round as shown in Figs. 3 and 4, or if desired, of other cross sectional shape, is grasped by one end in the tongs 31 and moved forward over the rest plate 28 in position to be engaged by the die impressions 20 of the rolls.

This movement of the bar is made when the rolls are substantially in the position shown in Fig. 2, and as the rolls continue to rotate in the direction of the arrows shown on said figure, the bar blank will be engaged by the impressions 20 of the dies, reducing and elongating the end portion of the bar and giving it substantially the shape shown in Figs. 5 and 6, the reduced end 33 being preferably rolled into slightly elliptic cross section as best illustrated in Fig. 6.

As the end of the bar is elongated by the dies, the bar will be moved backward out of the rolls and in order to continue the elongating operations the bar is successively inserted between each of the succeeding pairs of die impressions in the same manner as above described. Preferably the bar may be given a quarter turn before being inserted into each pair of die impressions.

As the bar is acted upon by the die impressions 21, the elongated end is further roll forged from its outer end inwardly to further elongate and reduce and taper the same outwardly, as indicated at 34 in Figs. 7 and 8, and as the partly completed product shown in said figures is again inserted between the rolls to be acted upon by the die impressions 22, the end portion of the bar is still further roll forged from its outer end inwardly to still further elongate and reduce and taper the same outwardly, as shown at 35 in Figs. 9 and 10.

The elongated end portion of the bar is then inserted between the rolls to be acted upon by the die impressions 23 and further roll forged from its outer end inwardly to further elongate and slightly flatten the same to substantially the shape shown at 36 in Figs. 11 and 12.

By subsequent passes through the die impressions 24, 25, 26 and 27 in the same manner, the elongated end portion of the bar is roll forged from its outer end inwardly to further elongate and flatten the same, producing successively the shapes shown at 37, 38, 39 and 40.

As the partly completed product emerges from the last pass of the forging rolls, it is shaped as shown at 40 in Figs. 19 and 20, being slightly less in width and of greater thickness than the finished blade.

In all of these successive steps the bar is roll forged from its outer end inwardly so as to produce a minimum of flash at the edges of the blade.

The rolled forging shown in Figs. 19 and 20 may then be placed beneath a hammer and hammer forged to the shape shown at 41 in Fig. 21, a slight flash or fin 42 being formed around the edges thereof. This fin is then sheared in the usual manner, forming the finished propeller blade, as shown at 43 in Figs. 22 and 23.

The flash or fin being of considerably less width and thickness than that produced by the old method, the spongy central portion of the metal is not extruded through the sides thereof so that when the same is cut off, the side edges of the finished propeller blade have spongy streaks as indicated at 44 in Fig. 25, but rather the spongy central portion is confined within the central portion of the blade, as shown at 45 in Fig. 24.

As shown in this figure, the spongy central portion is entirely surrounded by the more compact or refined grain structure indicated at 46, thus producing a considerably stronger forging and preventing any splitting at the sides thereof, as frequently happens with forgings made under the method now in general use.

By elongating the bar in the roll dies as herein described, and then hammer forging to finished size and shape, a substantially straight grain flow is maintained in the finished product and the bar blank may be rolled down more accurately to the necessary size, thus producing considerably less flash or fin, as illustrated in Fig. 21.

From the above it will be seen that the improved method of forging gives a substantially straight grain flow longitudinally of the finished propeller blade and a uniform molecular structure throughout the section thereof.

Although these propeller blades are ordinarily made of non-ferrous metal, such for instance as duralumin and the present improvement is directed especially to the forging of magnesium, it should be understood that the present invention contemplates the forging of such blades of either ferrous or non-ferrous metals.

Where non-ferrous metals are used it is preferred that the hammer or press dies, for the final operations, be heated to a temperature approximately that of the metal being forged, in order to cause the metal to retain its temperature, thus permitting the same to flow readily between the dies so as to be more easily and accurately forged to finished form.

It may also be desirable to heat the roll dies to about the same temperature as the metal in order to more readily roll forge the non-ferrous metal to the partly finished form.

While the several steps of the improved process are above illustrated and described as successively roll forging a portion of the bar blank into oval cross section by a quarter turn between passes, it should be understood that the results may be equally well attained by rolling to round, square or other cross sectional shape in the reducing and elongating steps of the process.

I claim:

1. The method of forging propeller blades which includes heating a bar blank, elongated and tapering one end portion of the bar blank by successive passes between a series of roll dies, further elongating and tapering the elongated portion of the bar blank by successive passes between a series of roll dies, the elongated portion being confined laterally and longitudinally to a predetermined size and shape during each successive pass, and then hammer forging the partly completed product to a finished forging.

2. The method of forging propeller blades which includes heating a bar blank, elongating and tapering one end portion of the bar blank by successive passes between a series of roll dies, further elongating and flattening the elongated portion of the bar blank by successive passes between a series of roll dies, the elongated portion being confined laterally and longitudinally to a predetermined size and shape during each successive pass, and then hammer forging the partly completed product to a finished forging.

3. The method of forging propeller blades which includes heating a bar blank of magnesium, elongating and tapering one end portion of the bar blank by successive passes between a series of roll dies, further elongating and tapering the elongated portion of the bar blank by successive passes between a series of roll dies, the elongated portion being confined laterally and longitudinally to a predetermined size and shape during each successive pass, and then hammer forging the partly completed product to a finished forging.

4. The method of forging propeller blades which includes heating a bar blank of magnesium, elongating and tapering one end portion of the bar blank by successive passes between a series of roll dies, further elongating and flattening the elongated portion of the bar blank by successive passes between a series of roll dies, the elongated portion being confined laterally and longitudinally to a predetermined size and shape during each successive pass, and then hammer forging the partly completed product to a finished forging.

5. The method of forging propeller blades which includes heating a bar blank, elongating and tapering one end portion of the bar blank by successive passes between a series of roll dies, further elongating and tapering the elongated portion of the bar blank by successive passes between a series of roll dies producing a partly finished product of slightly less width and greater thickness than desired in the finished blade, the elongated portion being confined laterally and longitudinally to a predetermined size and shape during each successive pass, and then hammer forging the partly completed product to a finished forging.

6. The method of forging propeller blades which consists in heating a bar blank of magnesium, roll forging one end portion of the bar blank from its outer end inwardly by successive passes between a series of roll dies to reduce and elongate the same, further roll forging the end portion from its outer end inwardly by successive passes between a series of roll dies to further elongate and flatten said end portion, and then hammer forging the partly completed product to finished forging.

7. The method of forging propeller blades which consists in heating a bar blank of magnesium, roll forging one end portion of the bar blank from its outer end inwardly by successive passes between a series of roll dies to reduce and elongate the same, further roll forging the end portion from its outer end inwardly by successive passes between a series of roll dies to further elongate and taper the same outwardly producing a product of slightly less width and greater thickness than desired in the finished blade, and then hammer forging the partly completed product to finished forging.

8. The method of forging propeller blades which consists in heating a bar blank of magnesium, roll forging one end portion of the bar blank from its outer end inwardly by successive passes between a series of roll dies to reduce and elongate the same, further roll forging the end portion from its outer end inwardly by successive passes between a series of roll dies to further elongate and flatten said end portion, turning the bar a quarter turn between passes, and then hammer forging the partly completed product to finished forging.

9. The method of forging propeller blades which consists in heating a bar blank of magnesium, roll forging one end portion of the bar blank from its outer end inwardly by successive passes between a series of roll dies to reduce and elongate the same, further roll forging the end portion from its outer end inwardly by successive passes between a series of roll dies to further elongate and taper the same outwardly producing a product of slightly less width and greater thickness than desired in the finished blade, turning the bar a quarter turn between passes, and then hammer forging the partly completed product to finished forging.

In testimony that I claim the above, I have hereunto subscribed my name.

CHARLES A. BRAUCHLER.